(12) United States Patent
Kawabe et al.

(10) Patent No.: US 8,423,266 B2
(45) Date of Patent: Apr. 16, 2013

(54) ENGINE

(75) Inventors: Takao Kawabe, Osaka (JP); Takashi Miyamoto, Osaka (JP); Kazuhiro Yamada, Osaka (JP); Tetsuo Sakaki, Kawasaki (JP); Isamu Kawashima, Kawasaki (JP)

(73) Assignee: Yanmar Co., Ltd., Osaka (JP)

( * ) Notice: Subject to any disclaimer, the term of this patent is extended or adjusted under 35 U.S.C. 154(b) by 335 days.

(21) Appl. No.: 12/921,746

(22) PCT Filed: Mar. 2, 2009

(86) PCT No.: PCT/JP2009/053880
§ 371 (c)(1),
(2), (4) Date: Sep. 9, 2010

(87) PCT Pub. No.: WO2009/113421
PCT Pub. Date: Sep. 17, 2009

(65) Prior Publication Data
US 2011/0023828 A1 Feb. 3, 2011

(30) Foreign Application Priority Data

Mar. 13, 2008 (JP) ................................. 2008-064574

(51) Int. Cl.
*F02D 41/30* (2006.01)
(52) U.S. Cl.
USPC ............. 701/104; 123/339.19; 123/339.2; 123/383; 123/445; 123/564; 123/559.1; 123/674; 701/102; 701/103; 60/606; 60/607; 60/608; 60/609
(58) Field of Classification Search .......... 123/339.19, 123/339.2, 375, 383, 387, 390, 445, 478, 123/492, 559.1, 564, 674; 701/102–104; 60/606–609
See application file for complete search history.

(56) References Cited

U.S. PATENT DOCUMENTS

| | | | | |
|---|---|---|---|---|
| 5,724,949 A | * | 3/1998 | Liang | 123/559.2 |
| 6,161,383 A | * | 12/2000 | Aschner et al. | 60/602 |
| 6,273,056 B1 | * | 8/2001 | Shirakawa et al. | 123/305 |
| 6,523,345 B2 | * | 2/2003 | Scherngell et al. | 60/602 |

(Continued)

FOREIGN PATENT DOCUMENTS

| | | |
|---|---|---|
| JP | 62-75087 | 5/1987 |
| JP | 05-248301 | 9/1993 |

(Continued)

OTHER PUBLICATIONS

International Search Report for PCT/JP2009/053880, mailed Apr. 7, 2009, 4 pages.

(Continued)

*Primary Examiner* — Stephen K Cronin
*Assistant Examiner* — Joseph Dallo
(74) *Attorney, Agent, or Firm* — Sterne, Kessler, Goldstein & Fox P.L.L.C.

(57) ABSTRACT

An engine in which a fluctuation in the amount of fuel injection is reduced in the entire operating tolerance of the engine. The engine (1) has an engine body (5) provided with a turbocharger (7), an engine speed sensor (21), a turbo sensor (22), a boost sensor (23), and an ECU (20) for correcting the amount of fuel injection. A control means recognizes an engine speed, a supercharging pressure, a supercharger speed, a fuel injection amount and corrects the fuel injection amount.

19 Claims, 6 Drawing Sheets

U.S. PATENT DOCUMENTS

| | | | |
|---|---|---|---|
| 6,665,604 B2 * | 12/2003 | Arnold | 701/100 |
| 6,681,573 B2 * | 1/2004 | Arnold | 60/602 |
| 6,698,203 B2 * | 3/2004 | Wang | 60/611 |
| 6,725,659 B1 * | 4/2004 | Shao et al. | 60/601 |
| 6,944,532 B2 * | 9/2005 | Bellinger | 701/115 |
| 6,959,686 B2 * | 11/2005 | Lee | 123/305 |
| 7,165,403 B2 * | 1/2007 | Sun et al. | 60/612 |
| 7,246,005 B2 * | 7/2007 | Johnson | 701/111 |
| 7,721,539 B2 * | 5/2010 | Reynolds et al. | 60/601 |
| 7,765,793 B2 * | 8/2010 | Nishiyama et al. | 60/280 |
| 2001/0032466 A1 * | 10/2001 | Waszkiewicz et al. | 60/602 |
| 2004/0016419 A1 | 1/2004 | Satou et al. | |
| 2005/0098146 A1 * | 5/2005 | Lee | 123/305 |
| 2006/0218920 A1 * | 10/2006 | Gokhale | 60/601 |
| 2007/0095063 A1 * | 5/2007 | Mischler et al. | 60/608 |
| 2007/0101977 A1 * | 5/2007 | Stewart | 123/679 |
| 2007/0271918 A1 * | 11/2007 | Nishiyama et al. | 60/600 |
| 2008/0051976 A1 * | 2/2008 | Kimoto et al. | 701/103 |

FOREIGN PATENT DOCUMENTS

| | | |
|---|---|---|
| JP | 11-093747 A | 4/1999 |
| JP | 11-324777 A | 11/1999 |
| JP | 2000-328999 A | 11/2000 |
| JP | 2005-220761 A | 8/2005 |
| JP | 2007-231821 | 9/2007 |
| JP | 2007-263127 A | 10/2007 |
| JP | 2007-303382 A | 11/2007 |
| JP | 2007-332793 A | 12/2007 |

OTHER PUBLICATIONS

The Notice of Reasons for Refusal for related Japanese Appl. No. 2008-064574, Japanese Patent Office, mailed Apr. 24, 2012, 6 pgs. (including translation).

* cited by examiner

ENGINE

TECHNICAL FIELD

The present invention relates to an engine having a supercharger.

BACKGROUND ART

In correspondence to recent tightening of exhaust restriction, improvement in accuracy of fuel injection control of an engine is required. From the viewpoint of securing a required engine performance, there is a serious problem that an injector has a variation in its precision of fuel injection amount according to a secular change thereof or because of precisional dispersion thereof when it is produced (hereinafter, the variation is referred to as Q-lag).

As trials for solving the problem of Q-lag, injectors are checked at the production thereof so as to reduce the precisional dispersion, or their quantities in injection or the like are checked. However, these trials are disadvantageous because of increasing production cost. These trials are also disadvantageous because the problem of Q-lag is not solved fundamentally.

As a fundamental means for solving the problem, it is conceivable to feed back a torque actually generated in the engine, that is, a fuel injection amount, so as to correct the Q-lag. For example, in the engine disclosed in the Japanese Patent Laid Open Gazette 2000-328999, the Q-lag is corrected based on engine output from a $\lambda$ sensor.

However, since the $\lambda$ sensor is provided in an exhaust system, response may be delayed in an engine having a supercharger or the like. As for an engine used in a car or a ship, the engine is often driven in a transient state, and the driving state of the engine in which the Q-lag is corrected is limited to its idling range and its low speed traveling range in which load is relatively small. Accordingly, the engine disclosed in the Japanese Patent Laid Open Gazette 2000-328999 is disadvantageous because its driving range subjected to improvement in reduction of dispersion of fuel injection amount is limited.

DISCLOSURE OF INVENTION

Problems To Be Solved By the Invention

The purpose of the present invention is to provide an engine in which a fluctuation in the amount of fuel injection is reduced in the entire operating range of the engine.

Means For Solving the Problems

An engine according to the present invention comprises: an engine body having a supercharger; an engine speed detection means which detects an engine speed; a supercharger speed detection means which detects a supercharger speed; a supercharging pressure detection means which detects a supercharging pressure; and a control means which corrects fuel injection amount, wherein the control means recognizes the engine speed, the supercharging pressure, the supercharger speed and the fuel injection amount and corrects the fuel injection amount.

In the engine according to the present invention, preferably, the control means calculates an appropriate supercharger speed and an appropriate supercharger speed tolerance based on the engine speed, the supercharging pressure and the fuel injection amount, and when the supercharger speed is not within the appropriate supercharger speed tolerance, the control means corrects the fuel injection amount so as to make the supercharger speed be within the appropriate supercharger speed tolerance.

In the engine according to the present invention, preferably, when the supercharger speed is within the appropriate supercharger speed range, the control means defines the fuel injection amount at the time of detection of the supercharger speed as a modified fuel injection amount corresponding to the appropriate supercharger speed.

In the engine according to the present invention, preferably, the control means calculates an appropriate supercharging pressure and an appropriate supercharging pressure tolerance based on the engine speed, the supercharger speed and the fuel injection amount, and when the supercharging pressure is not within the appropriate supercharging pressure tolerance, the control means corrects the fuel injection amount so as to make the supercharging pressure be within the appropriate supercharging pressure tolerance.

In the engine according to the present invention, preferably, when the supercharging pressure is within the appropriate supercharging pressure tolerance, the control means defines the supercharging pressure as a modified value of the appropriate supercharging pressure.

In the engine according to the present invention, preferably, the control means calculates an appropriate engine speed and an appropriate engine speed tolerance based on the supercharging pressure, the supercharger speed and the fuel injection amount, and when the engine speed is not within the appropriate engine speed tolerance, the control means corrects the fuel injection amount so as to make the engine speed be within the appropriate engine speed tolerance.

In the engine according to the present invention, preferably, when the engine speed is within the appropriate engine speed tolerance, the control means defines the engine speed as a modified value of the appropriate engine speed.

In the engine according to the present invention, preferably, the control means calculates an appropriate fuel injection amount correction tolerance based on the fuel injection amount, and when the corrected fuel injection amount is not within the appropriate fuel injection amount correction tolerance, the control means defines the corrected fuel injection amount as the maximum or minimum of the appropriate fuel injection amount correction tolerance.

In the engine according to the present invention, preferably, the control means defines an upper limit of the supercharger speed determined in correspondence to every engine speed as a supercharger speed upper limit, and when the supercharger speed becomes larger than the supercharger speed upper limit, the control means stops increase of the fuel injection amount.

In the engine according to the present invention, preferably, when the supercharger speed repeats exceeding the supercharger speed upper limit beyond a predetermined count, the control means judges that fuel injection is abnormal.

In the engine according to the present invention, preferably, the control means calculates an engine speed change rate based on the engine speed, calculates a supercharging pressure change rate based on the supercharging pressure, calculates a supercharger speed change rate based on the supercharger speed, calculates a fuel injection amount change rate, and recognizes the engine speed change rate, the supercharging pressure change rate, the supercharger speed change rate and the fuel injection amount change rate and corrects the fuel injection amount.

In the engine according to the present invention, preferably, the control means calculates an appropriate supercharger speed change rate and an appropriate supercharger speed change rate tolerance based on the engine speed change rate, the supercharging pressure change rate and the fuel injection amount change rate, and when the supercharger speed change rate is not within the appropriate supercharger speed change rate tolerance, the control means corrects the fuel injection amount so as to make the supercharger speed change rate be within the appropriate supercharger speed change rate tolerance.

In the engine according to the present invention, preferably, when the supercharger speed change rate is within the appropriate supercharger speed change rate tolerance, the control means defines the supercharger speed change rate as a modified value of the appropriate supercharger speed change rate.

In the engine according to the present invention, preferably, the control means calculates an appropriate supercharging pressure change rate and an appropriate supercharging pressure change rate tolerance based on the engine speed change rate, the supercharger speed change rate and the fuel injection amount change rate, and when the supercharging pressure change rate is not within the appropriate supercharging pressure change rate tolerance, the control means corrects the fuel injection amount so as to make the supercharging pressure change rate be within the appropriate supercharging pressure change rate tolerance.

In the engine according to the present invention, preferably, when the supercharging pressure change rate is within the appropriate supercharging pressure change rate tolerance, the control means defines the supercharging pressure change rate as a modified value of the appropriate supercharging pressure change rate.

In the engine according to the present invention, preferably, the control means calculates an appropriate engine speed change rate and an appropriate engine speed change rate tolerance based on the supercharger speed change rate, the supercharging pressure change rate and the fuel injection amount change rate, and when the engine speed change rate is not within the appropriate engine speed change rate tolerance, the control means corrects the fuel injection amount so as to make the engine speed change rate be within the appropriate engine speed change rate tolerance.

In the engine according to the present invention, preferably, when the engine speed change rate is within the appropriate engine speed change rate tolerance, the control means defines the engine speed change rate as a modified value of the appropriate engine speed change rate.

EFFECT OF THE INVENTION

According to the present invention, fuel injection amount is corrected based on supercharger speed, whereby dispersion of fuel injection amount is reduced in an entire engine driving range.

THE BEST MODE FOR CARRYING OUT THE INVENTION

Figure 1:
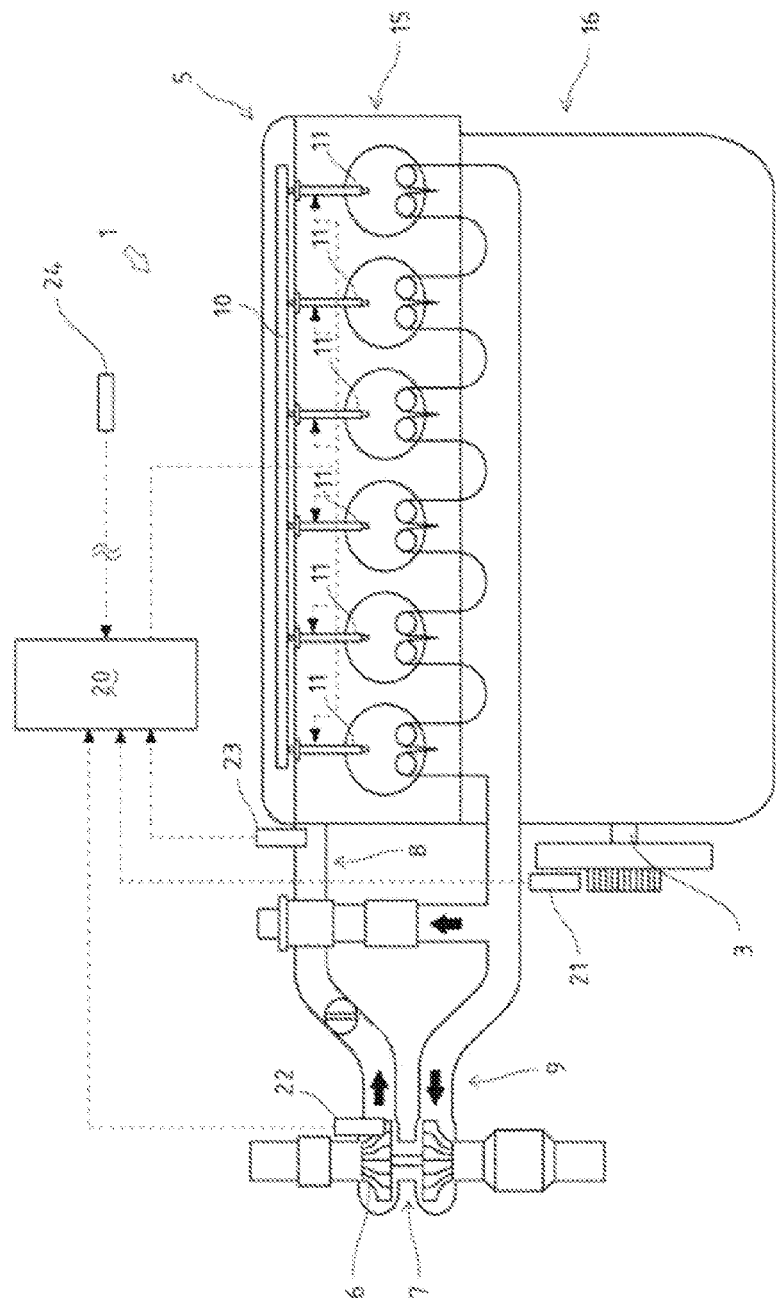
[FIG. 1] It is a schematic structural diagram of an entire engine according to an embodiment of the present invention.

Explanation will be given on an engine 1 serving as an embodiment. The engine 1 includes an engine body 5 having a turbocharger 7 as a supercharger, an Engine Control Unit (hereinafter, referred to as ECU) 20 as a control means, an engine speed sensor 21 as an engine speed detection means, a turbo sensor 22 as a supercharger speed detection means, and a boost sensor 23 as a supercharging pressure detection means.

The engine body 5 includes a cylinder head 15 and a cylinder block 16. The cylinder head 15 is provided thereon with an intake manifold (not shown) to which an intake pipe 8 is connected, and is provided thereon with an exhaust manifold (not shown) to which an exhaust pipe 9 is connected. In the cylinder block 16, a crankshaft 3 is pivotally supported by the cylinder block 16.

The turbocharger 7 includes a turbine disposed in the exhaust pipe 9 and a compressor disposed in the intake pipe 8.

A fuel injection device includes a common rail 10 and injectors 11. The common rail 10 is a pressure vessel in which fuel delivered by a fuel injection pump (not shown) is accumulated. Each of the injectors 11 injects the fuel accumulated in the common rail 10 to corresponding one of cylinders.

The ECU 20 is connected to the engine speed sensor 21, the turbo sensor 22, the boost sensor 23, an accelerator opening sensor 24 and the injectors 11. Instead of the accelerator opening sensor 24, a throttle lever opening sensor may alternatively be connected.

The engine speed sensor 21 is provided in the vicinity of the crankshaft 3 and detects an engine speed Ne.

The turbo sensor 22 is provided at a side of a compressor 6 in the turbocharger 7, and generates rotational pulses corresponding to the number of blades of the compressor 6 and detects a supercharger speed (turbo speed) Nc. As the turbo sensor 22, for example, an eddy-current sensor or a hall sensor may be used. The turbo speed Nc may be divided by a predetermined ratio so as to reduce operation load of the ECU 20.

The boost sensor 23 is provided in the intake pipe 8 and detects a supercharging pressure (boost pressure) Pb. The accelerator opening sensor 24 is provided in a rotational basal part of an accelerator and detects accelerator opening Ac.

The ECU 20 has a function to calculate a fuel injection amount Q with a fuel injection amount map f3q (Ne, Ac, Q) based on the engine speed Ne and the accelerator opening Ac. The fuel injection amount map f3q (Ne, Ac, Q) is a three-dimensional map previously stored in a storage device of the ECU 20.

The ECU 20 has a function to calculate an appropriate engine speed Nemap with an appropriate engine speed map f3e (Nemap, Nc, Q) based on the turbo speed Nc and the fuel injection amount Q. The appropriate engine speed map f3e (Nemap, Nc, Q) is a three-dimensional map, which shows correlations among the turbo speed, the appropriate engine speed Nemap and the fuel injection amount Q, and is previously stored in the storage device of the ECU 20.

The ECU 20 has a function to calculate an appropriate turbo speed Ncmap with an appropriate turbo speed map f3c (Ne, Ncmap, Q) based on the engine speed Ne and the fuel injection amount Q. The appropriate turbo speed map f3c (Ne, Ncmap, Q) is a three-dimensional map, which shows the correlation among the engine speed Ne, the appropriate turbo speed Ncmap and the fuel injection amount Q, and is previously stored in the storage device of the ECU 20.

[Embodiment 1]

Figure 2:
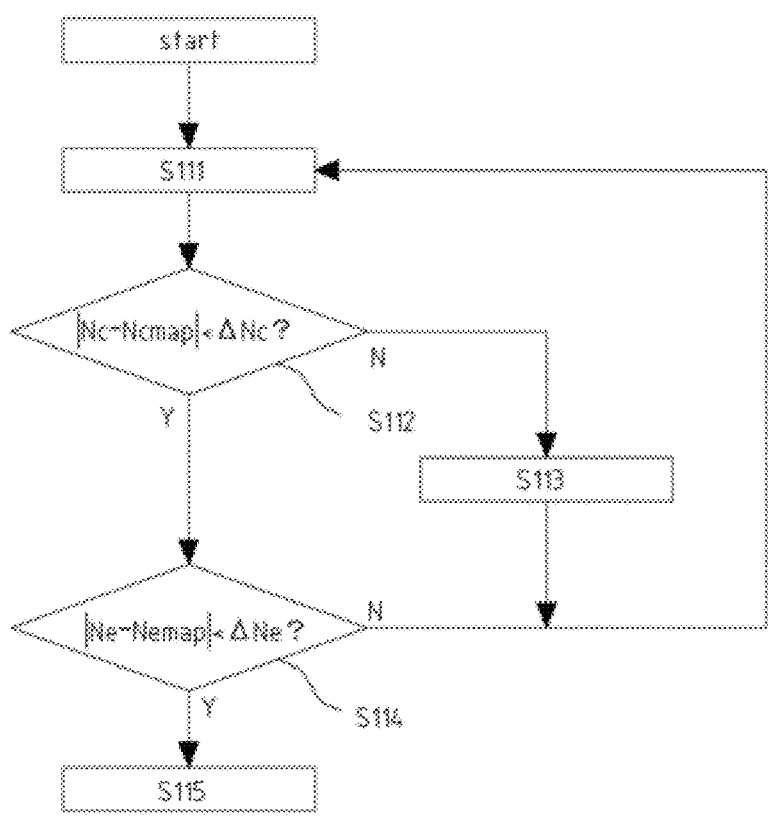
[FIG. 2] It is a flow chart of a fuel injection amount correction control for the engine according to an embodiment 1.

Explanation will be given on flow of fuel injection amount correction control according to an embodiment 1 with reference to FIG. 2.

At S111, the ECU 20 obtains physical quantities required for this control. Namely, the ECU 20 obtains the engine speed Ne, the turbo speed Nc and the accelerator opening Ac by the engine speed sensor 21, the turbo sensor 22 and the accelerator opening sensor 24, respectively.

The ECU 20 calculates the fuel injection amount Q with the fuel injection amount map f3q (Ne, Ac, Q) based on the engine speed Ne and the accelerator opening Ac.

Furthermore, at S111, the ECU 20 calculates the appropriate turbo speed Ncmap with the appropriate turbo speed map f3c (Ne, Ncmap, Q) based on the engine speed Ne and the fuel injection amount Q, and calculates a tolerance threshold ±ΔNc of the appropriate turbo speed Ncmap. The threshold ±ΔNc is determined in correspondence to every appropriate turbo speed Ncmap, and also varies according to variations of the engine speed Ne and the fuel injection amount Q.

Moreover, at S111, the ECU 20 calculates the appropriate engine speed Nemap with the appropriate engine speed map f3e (Nemap, Nc, Q) based on the turbo speed Nc and the fuel injection amount Q, and calculates a tolerance threshold ±ΔNe of the appropriate engine speed Nemap. The threshold ±ΔNe is determined in correspondence to every appropriate engine speed Nemap, and also varies according to variations of the turbo speed Nc and the fuel injection amount Q.

At S112, the ECU 20 judges whether an absolute value of difference between the turbo speed Nc and the appropriate turbo speed Ncmap is smaller than the threshold ΔNc or not.

At S113, in the case that the judgment of S112 is "No", when the turbo speed Nc minus the appropriate turbo speed Ncmap is smaller than 0, the ECU 20 increases the fuel injection amount Q until the turbo speed Nc becomes larger than the appropriate turbo speed Ncmap plus the threshold ΔNc.

On the other hand, when the turbo speed Nc minus the appropriate turbo speed Ncmap is larger than 0, the ECU 20 decreases the fuel injection amount Q until the turbo speed Nc becomes smaller than the appropriate turbo speed Ncmap minus the threshold ΔNc. After finishing the process, the ECU 20 returns to S111.

At S114, the ECU 20 judges whether an absolute value of difference between the engine speed Ne and the appropriate engine speed Nemap is smaller than the threshold ΔNe or not. When the judgment of S114 is "No", the ECU 20 returns to S111.

When the judgment of S114 is "Yes", at S115, the ECU 20 replaces the value of the fuel injection amount Q in the appropriate turbo speed map f3c (Ne, Ncmap, Q) and the appropriate engine speed map f3e (Nemap, Nc, Q) with the actual fuel injection amount Q.

Accordingly, the fuel injection amount Q is corrected based on the turbo speed Nc, whereby the dispersion of the fuel injection amount is reduced. By modifying the appropriate turbo speed Ncmap, the fuel injection amount can be corrected to correspond to the secular change of the fuel injection device.

[Embodiment 2]

Figure 3:
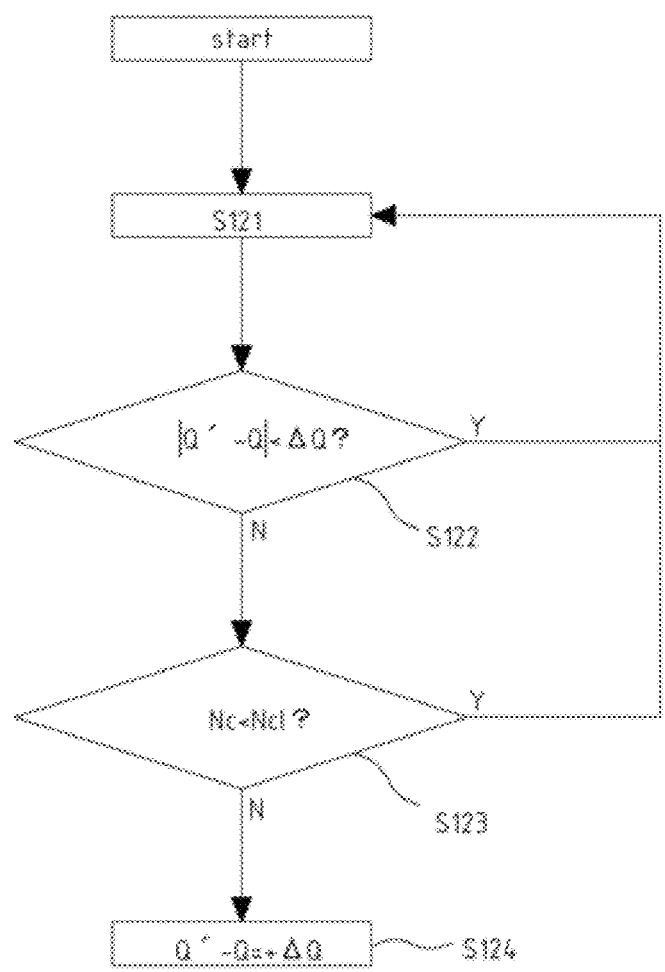
[FIG. 3] It is a flow chart of a fuel injection amount correction control for the engine according to an embodiment 2.

Explanation will be given on flow of fuel injection amount correction control according to embodiment 2 with reference to FIG. 3.

At S121, the ECU 20 obtains physical quantities required for this control. Namely, the ECU 20 obtains the engine speed Ne, the turbo speed Nc and the accelerator opening Ac.

The ECU 20 calculates the fuel injection amount Q with the fuel injection amount map f3q (Ne, Ac, Q) based on the engine speed Ne and the accelerator opening Ac.

Furthermore, the ECU 20 calculates the appropriate turbo speed Ncmap with the appropriate turbo speed map f3c (Ne, Ncmap, Q) based on the engine speed Ne and the fuel injection amount Q.

Furthermore, at S121, the ECU 20 calculates a tolerance change amount ±ΔQ of the fuel injection amount Q. The threshold ±ΔQ is determined in correspondence to every fuel injection amount Q, and also varies according to variations of the engine speed Ne and the turbo speed Nc. Moreover, the ECU 20 calculates a turbo speed upper limit Ncl determined based on the engine speed Ne.

At S122, the ECU 20 judges whether a difference between a corrected fuel injection amount Q' and the fuel injection amount Q is within the threshold ±ΔQ or not. When the judgment of S122 is "Yes", the process is returned to S121.

At S123, when the judgment of S122 is "No", the ECU 20 judges whether the turbo speed Nc is smaller than the turbo speed upper limit Ncl or not. When the judgment of S122 is "Yes", the process is returned to S121.

At S124, when the judgment of S123 is "No", the ECU 20 fixes the difference between the corrected fuel injection amount Q' and the fuel injection amount Q to ±ΔQ.

Accordingly, the difference between the corrected fuel injection amount Q' and the fuel injection amount Q is defined as an appropriate fuel injection amount correction tolerance, whereby the corrected fuel injection amount Q' is prevented from being excessively large or small. The difference between the corrected fuel injection amount Q' and the fuel injection amount Q is restricted based on the turbo speed Nc, whereby the corrected fuel injection amount Q' is prevented from being excessively large.

[Embodiment 3]

Figure 4:
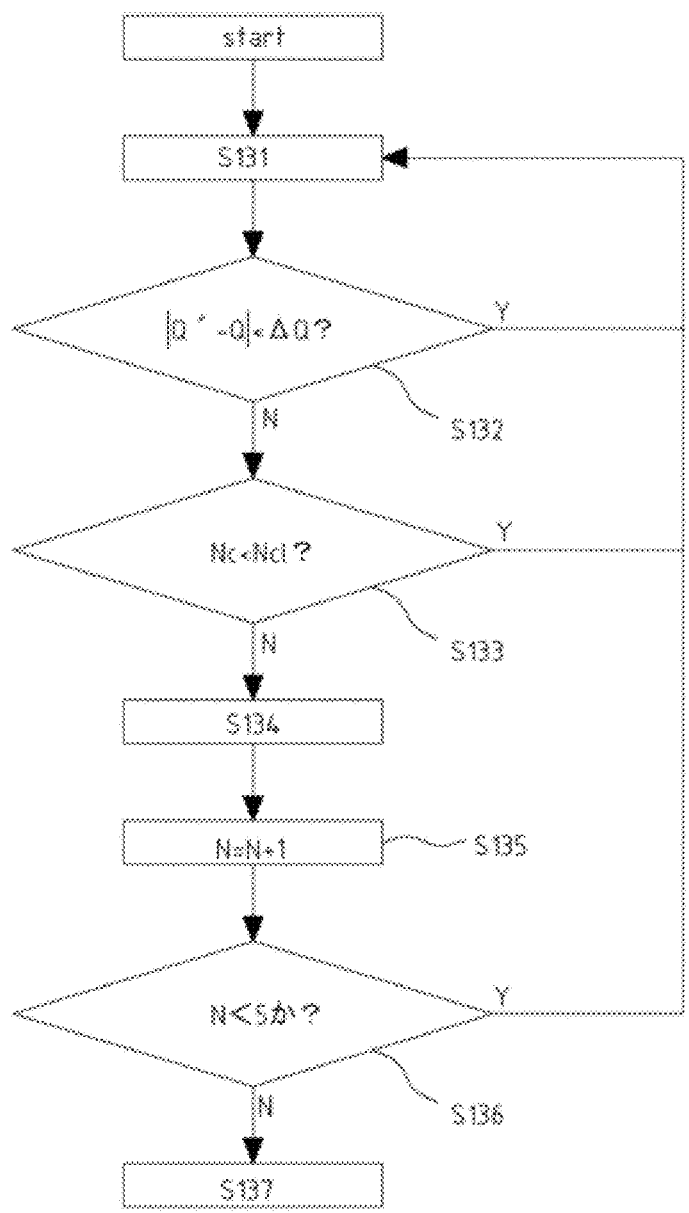
[FIG. 4] It is a flow chart of a fuel injection amount abnormality detection control for the engine according to an embodiment 3.

Explanation will be given on flow of fuel injection amount abnormality detection control according to an embodiment 3 with reference to FIG. 4. In the embodiment 3, steps S131 to 133 are respectively similar to S121 to S123 in the embodiment 2, therefore explanation thereof is omitted.

At S134, when the turbo speed Nc is larger than the turbo speed upper limit Ncl, the ECU 20 stops the increase of the fuel injection amount Q.

At S135, "N" is a fuel injection abnormality judgment counter value N, and the ECU 20 executes "N=N+1".

At S136, the ECU 20 judges whether the fuel injection abnormality judgment counter value N is smaller than 5 or not. When the judgment of S136 is "Yes", the process is returned to S131.

At S137, when the judgment of S136 is "No", the ECU 20 decides that the state is engine failure. After the decision of the engine failure, derating control is performed so that the engine 1 is decelerated by stages so as to be stopped.

Accordingly, the abnormality of fuel injection amount can be detected precisely based on the turbo speed Nc.

[Embodiment 4]

Figure 5:
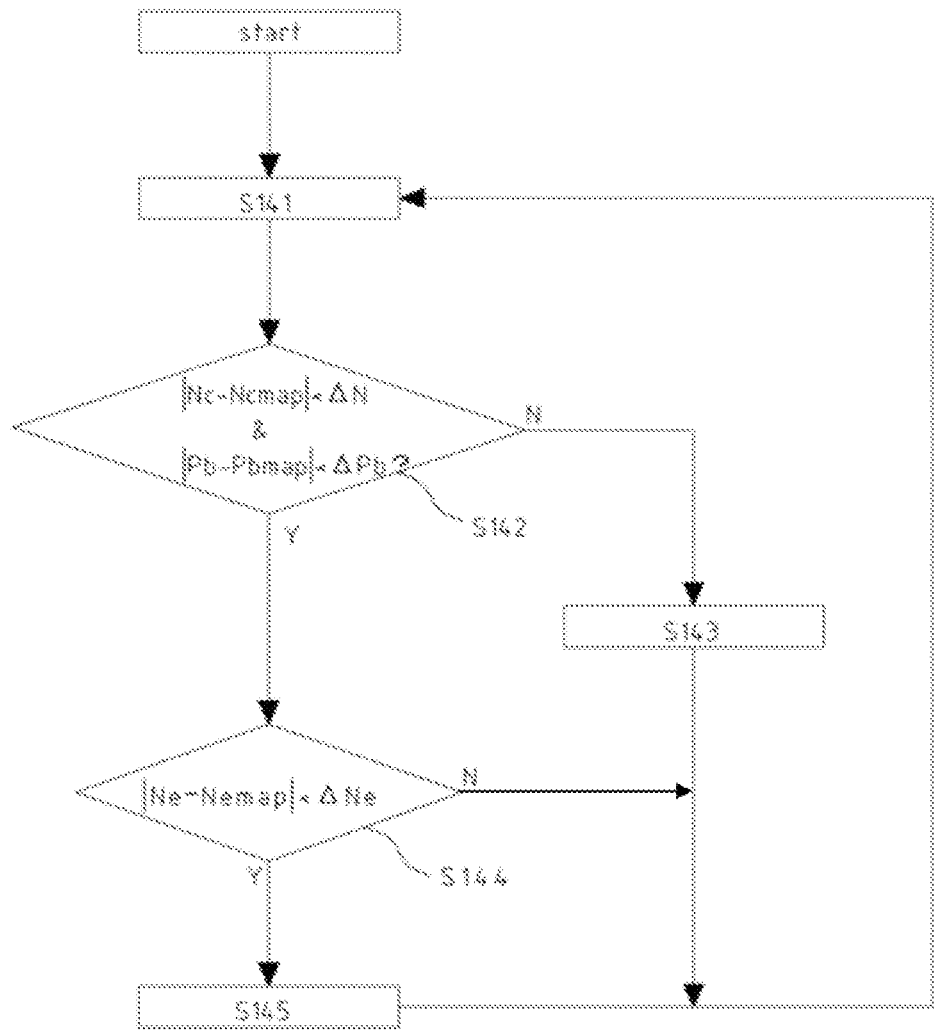
[FIG. 5] It is a flow chart of a fuel injection amount correction control for the engine according to an embodiment 4.

Explanation will be given on flow of fuel injection amount correction control according to an embodiment 4 with reference to FIG. 5.

The ECU 20 calculates the appropriate engine speed Nemap with an appropriate engine speed map f4e (Nemap, Nc, Pb, Q) based on the turbo speed Nc, the boost pressure Pb and the fuel injection amount Q. The appropriate engine speed map f4e (Nemap, Nc, Pb, Q) is a four-dimensional map, which shows correlations among the appropriate engine speed Nemap, the turbo speed Nc, the boost pressure Pb and the fuel injection amount Q, and is previously stored in the storage device of the ECU 20.

The ECU 20 calculates the appropriate turbo speed Ncmap with an appropriate turbo speed map f4c (Ne, Ncmap, Pb, Q) based on the engine speed Ne, the boost pressure Pb and the fuel injection amount Q. The appropriate turbo speed map f4c (Ne, Ncmap, Pb, Q) is a four-dimensional map, which shows correlations among the engine speed Ne, the boost pressure Pb, the appropriate turbo speed Ncmap and the fuel injection amount Q, and is previously stored in the storage device of the ECU 20.

The ECU 20 calculates an appropriate boost pressure Pbmap with an appropriate boost pressure map f4p (Ne, Nc, Pbmap, Q) based on the engine speed Ne, the turbo speed Nc and the fuel injection amount Q. The appropriate boost pressure map f4p (Ne, Nc, Pbmap, Q) is a four-dimensional map, which shows correlations among the engine speed Ne, the appropriate boost pressure Pbmap, the turbo speed Nc and the fuel injection amount Q, and is previously stored in the storage device of the ECU 20.

At S141, the ECU 20 obtains physical quantities required for this control. Namely, the ECU 20 obtains the engine speed Ne, the turbo speed Nc, the boost pressure Pb and the accelerator opening Ac.

The ECU 20 calculates the fuel injection amount Q with the fuel injection amount map f3q (Ne, Ac, Q) based on the engine speed Ne and the accelerator opening Ac.

Furthermore, at S141, the ECU 20 calculates the appropriate turbo speed Ncmap with the appropriate turbo speed map f4c (Ne, Ncmap, Pb, Q) based on the engine speed Ne, the fuel injection amount Q and the boost pressure Pb, and calculates a tolerance threshold ±ΔNc of the appropriate turbo speed Ncmap. The threshold ±ΔNc is determined in correspondence to every appropriate turbo speed Ncmap and also varies according to variations of the engine speed Ne, the boost pressure Pb and the fuel injection amount Q.

Moreover, the ECU 20 calculates a tolerance threshold ±ΔPb of the appropriate boost pressure Pbmap. The threshold ±ΔPb is determined in correspondence to every appropriate boost pressure Pbmap and also varies according to variations of the engine speed Ne, the turbo speed Nc and the fuel injection amount Q.

At S142, the ECU 20 judges whether or not an absolute value of difference between the turbo speed Nc and the appropriate turbo speed Ncmap is smaller than the threshold ΔNc and an absolute value of difference between the boost pressure Pb and the appropriate boost pressure Pbmap is smaller than the threshold ΔPb.

At S143, in the case that the judgment of S142 is "No", the ECU 20 performs following processes. When the turbo speed Nc minus the appropriate turbo speed Ncmap is smaller than 0 and the boost pressure Pb minus the appropriate boost pressure Pbmap is smaller than 0, the ECU 20 increases the fuel injection amount Q until the turbo speed Nc becomes larger than the appropriate turbo speed Ncmap plus the threshold ΔNc.

On the other hand, at S143, when the turbo speed Nc is larger than the appropriate turbo speed Ncmap and the boost pressure Pb minus the appropriate boost pressure Pbmap is larger than 0, the ECU 20 decreases the fuel injection amount Q until the turbo speed Nc becomes smaller than the appropriate turbo speed Ncmap minus the threshold ΔNc.

After finishing the process, the ECU 20 returns to S141.

At S144, in the case that the judgment of S142 is "Yes", the ECU 20 judges whether the absolute value of difference between the engine speed Ne and the appropriate engine speed Nemap is smaller than the threshold ΔNe or not. When the judgment is "No" the ECU 20 returns to S141.

At S146, when the judgment of S145 is "Yes", the ECU 20 replaces the value of the fuel injection amount Q in the appropriate engine speed map f4e (Nemap, Nc, Pb, Q), the appropriate turbo speed map f4c (Ne, Ncmap, Pb, Q) and the appropriate boost pressure map f4p (Ne, Nc, Pbmap, Q) with the actual fuel injection amount Q.

Accordingly, the fuel injection amount Q is corrected based on the turbo speed Nc, whereby the dispersion of the fuel injection amount is reduced. By modifying the appropriate engine speed map f4e (Nemap, Nc, Pb, Q), the appropriate turbo speed map f4c (Ne, Ncmap, Pb, Q) and the appropriate boost pressure map f4p (Ne, Nc, Pbmap, Q), the fuel injection amount can be corrected to correspond to the secular change of the fuel injection device.

[Embodiment 5]

Figure 6:
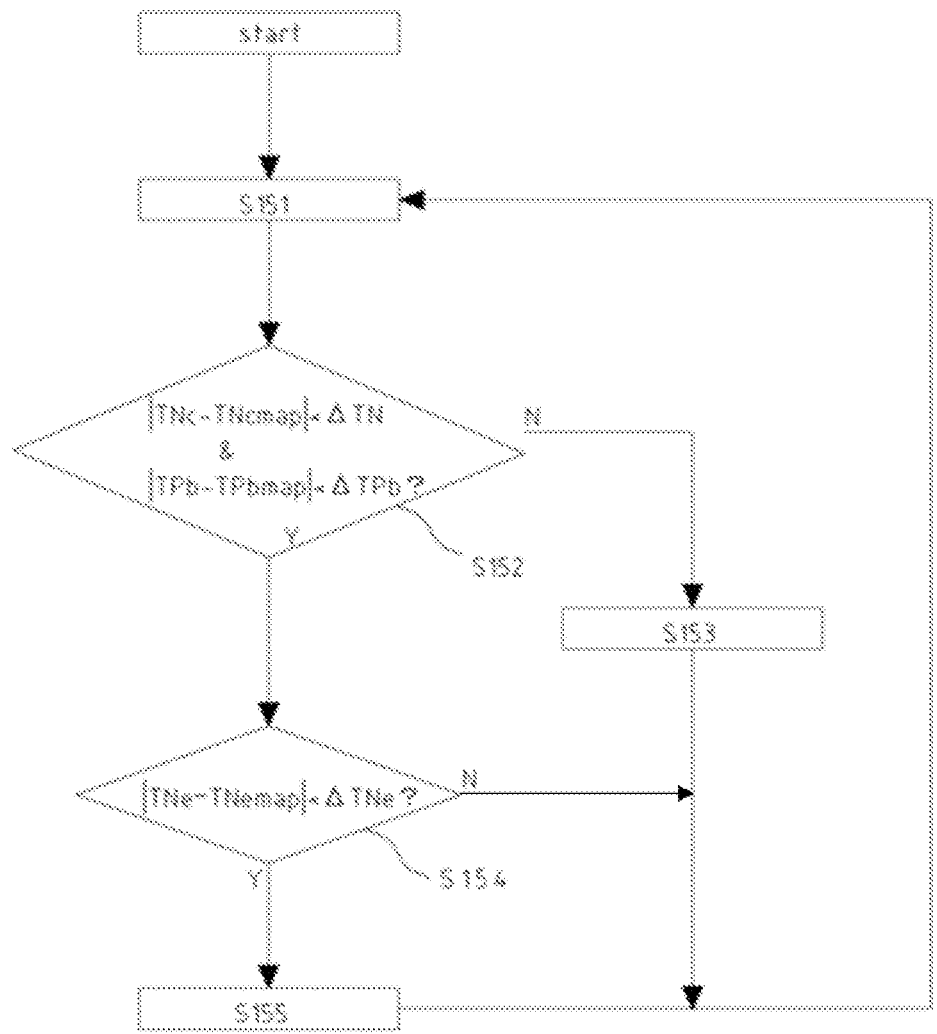
[FIG. 6] It is a flow chart of a fuel injection amount correction control for the engine according to an embodiment 5.

Explanation will be given on flow of fuel injection amount correction control according to an embodiment 5 with reference to FIG. 6.

The ECU 20 calculates an engine speed change rate TNe which is a rate of change of the engine speed Ne per predetermined time. The ECU 20 calculates a turbo speed change rate TNc which is a rate of change of the turbo speed Nc per predetermined time. Furthermore, the ECU 20 calculates a boost pressure change rate TPb which is a rate of change of the boost pressure Pb per predetermined time.

The ECU 20 has a fuel injection amount change rate map f3Tq (TNe, Ac, TQ). The fuel injection amount change rate map f3Tq (TNe, Ac, TQ) is a three-dimensional map which shows correlations among the engine speed change rate TNe, the accelerator opening Ac and a fuel injection amount change rate TQ. When the engine speed change rate TNe and the accelerator opening Ac are determined, the fuel injection amount change rate TQ can be determined monovalently with the fuel injection amount change rate map f3Tq (TNe, Ac, TQ).

The ECU 20 calculates an appropriate engine speed change rate TNemap with an appropriate engine speed change rate map f4Te (TNemap, TNc, TPb, TQ) based on the turbo speed change rate TNc, the boost pressure change rate TPb and the fuel injection amount change rate TQ. The appropriate engine speed change rate map f4Te (TNemap, TNc, TPb, TQ) is a four-dimensional map, which shows correlations among the appropriate engine speed change rate TNemap, the boost pressure change rate TPb, the turbo speed change rate TNc and the fuel injection amount change rate TQ, and is previously stored in the storage device of the ECU 20.

The ECU 20 calculates an appropriate turbo speed change rate TNcmap with an appropriate turbo speed change rate map f4Tc (TNe, TNcmap, TPb, TQ) based on the engine speed change rate TNe, the boost pressure change rate TPb and the fuel injection amount change rate TQ. The appropriate turbo speed change rate map f4Tc (TNe, TNcmap, TPb, TQ) is a four-dimensional map, which shows correlations among the engine speed change rate TNe, the boost pressure change rate TPb, the appropriate turbo speed change rate TNcmap and the fuel injection amount change rate TQ, and is previously stored in the storage device of the ECU 20.

The ECU 20 calculates an appropriate boost pressure TPbmap with an appropriate boost pressure change rate map f4Tp (TNe, TNc, TPbmap, TQ) based on the engine speed change rate TNe, the turbo speed change rate TNc and the fuel injection amount change rate TQ. The appropriate boost pressure change rate map f4Tp (TNe, TNc, TPbmap, TQ) is a four-dimensional map, which shows correlations among the engine speed change rate TNe, the appropriate boost pressure change rate TPbmap, the turbo speed change rate TNc and the fuel injection amount change rate TQ, and is previously stored in the storage device of the ECU 20.

At S151, the ECU 20 obtains physical quantities required for this control. Namely, the ECU 20 calculates the engine speed change rate TNe, the turbo speed change rate TNc and the boost pressure change rate TPb. The ECU 20 obtains the accelerator opening Ac by the accelerator opening sensor 24.

The ECU 20 calculates the fuel injection amount change rate TQ with the fuel injection amount change rate map f3Tq (TNe, Ac, TQ) based on the engine speed change rate TNe and the accelerator opening Ac.

Furthermore, at S151, the ECU 20 calculates the appropriate engine speed change rate TNemap with the appropriate engine speed change rate map f4Te (TNemap, TNc, TPb, TQ) based on the turbo speed change rate TNc, the boost pressure change rate TPb and the fuel injection amount change rate TQ.

At S151, the ECU 20 calculates a tolerance threshold $\pm\Delta$TNe of the appropriate engine speed change rate TNemap. The threshold $\pm\Delta$TNe is determined in correspondence to every appropriate engine speed change rate TNemap and also varies according to variations of the turbo speed change rate TNc, the boost pressure change rate TPb and the fuel injection amount change rate TQ.

Furthermore, at S151, the ECU 20 calculates the appropriate turbo speed change rate TNcmap with the appropriate turbo speed change rate map f4Te (TNe, TNcmap, TPb, TQ) based on the engine speed change rate TNe, the boost pressure change rate TPb and the fuel injection amount change rate TQ, and calculates a tolerance threshold $\pm\Delta$TNc of the appropriate turbo speed change rate TNcmap. The threshold $\pm\Delta$TNc is determined in correspondence to every appropriate turbo speed change rate TNcmap and also varies according to variations of the engine speed change rate TNe, the boost pressure change rate TPb and the fuel injection amount change rate TQ.

Moreover, at S151, the ECU 20 calculates the appropriate boost pressure change rate TPbmap with the appropriate boost pressure change rate map f4Tp (TNe, TNc, TPbmap, TQ) based on the engine speed change rate TNe, the turbo speed change rate TNc and the fuel injection amount change rate TQ, and calculates a tolerance threshold $\pm\Delta$TPb of the appropriate boost pressure change rate TPbmap. The threshold $\pm\Delta$TPb is determined in correspondence to every appropriate boost pressure change rate TPbmap and also varies according to variations of the engine speed change rate TNe, the turbo speed change rate TNc and the fuel injection amount change rate TQ.

At S152, the ECU 20 judges whether or not an absolute value of difference between the turbo speed change rate TNc and the appropriate turbo speed change rate TNcmap is smaller than the threshold $\Delta$TNc and an absolute value of difference between the boost pressure change rate TPb and the appropriate boost pressure change rate TPbmap is smaller than the threshold $\Delta$TPb or not.

At S153, in the case that the judgment of S152 is "No", the ECU 20 performs following processes. When the turbo speed change rate TNc minus the appropriate turbo speed change rate TNcmap is smaller than 0 and the boost pressure change rate TPb minus the appropriate boost pressure change rate TPbmap is smaller than 0, the ECU 20 performs injection characteristic feedback control so as to make the turbo speed change rate TNc larger than the appropriate turbo speed change rate TNcmap plus the threshold $\Delta$TNc.

On the other hand, at S153, when the turbo speed change rate TNc is larger than the appropriate turbo speed change rate TNcmap and the boost pressure change rate TPb minus the appropriate boost pressure change rate TPbmap is larger than 0, the ECU 20 performs injection characteristic feedback control so as to make the turbo speed change rate TNc smaller than the appropriate turbo speed change rate TNcmap minus the threshold $\Delta$TNc. After finishing the process, the ECU 20 returns to S151.

At S154, in the case that the judgment of S152 is "Yes", the ECU 20 judges whether the absolute value of difference between the engine speed change rate TNe and the appropriate engine speed change rate TNemap is smaller than the threshold $\Delta$TNe or not. When the judgment is "No", the ECU 20 returns to S151.

At S155, when the judgment of S154 is "Yes", the ECU 20 replaces the value of the fuel injection amount change rate TQ in the appropriate turbo speed change rate map f4Tc (TNcmap, TNe, TPb, TQ), the appropriate boost pressure change rate map f4Tp (TNe, TNc, TPbmap, TQ) and the appropriate engine speed change rate map f4Te (TNemap, TNc, TPb, TQ) with the actual fuel injection amount change rate TQ.

Accordingly, in the engine 1 having the turbocharger 7, the dispersion of the fuel injection amount at the acceleration/deceleration state of the engine 1 can be corrected based on the turbo speed change rate TNc, the boost pressure change rate TPb and the engine speed change rate TNe. By modifying the turbo speed change rate TNc, the boost pressure change rate TPb and the engine speed change rate TNe, the fuel injection amount can be corrected to correspond to the secular change of the fuel injection device.

INDUSTRIAL APPLICABILITY

The present invention is adoptable to an engine.

The invention claimed is:

1. An engine comprising:
an engine body having a supercharger;
an engine speed detection means which detects an engine speed;
a supercharger speed detection means which detects a supercharger speed;
a supercharging pressure detection means which detects a supercharging pressure; and
a control means which corrects a fuel injection amount,
wherein the control means is configured to:
  recognize the engine speed, the supercharging pressure, the supercharger speed and the fuel injection amount;
  calculate an appropriate value and an appropriate tolerance for a parameter selected from the group consisting of the engine speed, the supercharging pressure, and the supercharger speed, wherein the calculation of the appropriate value and the appropriate tolerance for the selected parameter is based on the fuel injection amount and the unselected parameters; and
  correct the fuel injection amount when the selected parameter is not within the appropriate tolerance.

2. The engine according to claim 1,
wherein the, selected parameter is the supercharger speed, the appropriate value is an appropriate supercharger speed, the appropriate tolerance is an appropriate supercharger speed tolerance, and the control means is configured to calculate the appropriate supercharger speed and the appropriate supercharger speed tolerance based on the engine speed, the supercharging pressure and the fuel injection amount, and wherein, when the supercharger speed is not within the appropriate supercharger speed tolerance, the control means is configured to correct the fuel injection amount so as to make the supercharger speed be within the appropriate supercharger speed tolerance.

3. The engine according to claim 2, wherein, when the supercharger speed is within the appropriate supercharger speed tolerance, the control means defines the fuel injection amount at the time of detection of the supercharger speed as a modified fuel injection amount corresponding to the appropriate supercharger speed.

4. The engine according to claim 1,
wherein the selected parameter is the supercharging pressure the appropriate value is an appropriate supercharging pressure, the appropriate tolerance is an appropriate supercharging pressure tolerance, and the control means is configured to calculate the appropriate supercharging pressure and the appropriate supercharging pressure tolerance based on the engine speed, the supercharger speed and the fuel injection amount, and wherein, when the supercharging pressure is not within the appropriate supercharging pressure tolerance, the control means is configured to correct the fuel injection amount so as to make the supercharging pressure be within the appropriate supercharging pressure tolerance.

5. The engine according to claim 4, wherein, when the supercharging pressure is within the appropriate supercharging pressure tolerance, the control means defines the supercharging pressure as a modified valued of the appropriate supercharging pressure.

6. The engine according to claim 1,
wherein the selected parameter is the engine speed, the appropriate value is an appropriate engine speed, the appropriate tolerance is an appropriate engine speed tolerance, and the control means is configured to calculate the appropriate engine speed and the appropriate engine speed tolerance based on the supercharging pressure, the supercharger speed and the fuel injection amount, and wherein, when the engine speed is not within the appropriate engine speed tolerance, the control means is configured to correct the fuel injection amount so as to make the engine speed be within the appropriate engine speed tolerance.

7. The engine according to claim 6, wherein, when the engine speed is within the appropriate engine speed tolerance, the control means defines the engine speed as a modified value of the appropriate engine speed.

8. The engine according to claim 2,
wherein the control means is configured to calculate an appropriate fuel injection amount correction tolerance based on the fuel injection amount, and wherein, when the corrected fuel injection amount is not within the appropriate fuel injection amount correction tolerance, the control means defines the corrected fuel injection amount as the maximum or minimum of the appropriate fuel injection amount correction tolerance.

9. The engine according to claim 8, wherein the control means defines an upper limit of the supercharger speed determined in correspondence to every engine speed as a supercharger speed upper limit, and wherein, when the supercharger speed becomes larger than the supercharger speed upper limit, the control means stops increase of the fuel injection amount.

10. The engine according to claim 9, wherein, when the supercharger speed repeats exceeding the supercharger speed upper limit beyond a predetermined count, the control means judges that fuel injection is abnormal.

11. The engine according to claim 1, wherein the control means is configured to:
calculate an engine speed change rate based on the engine speed, a supercharging pressure change rate based on the supercharging pressure, a supercharger speed change rate based on the supercharger speed, a fuel injection amount change rate;
recognize the engine speed change rate, the supercharging pressure change rate, the supercharger speed change rate and the fuel injection amount change rate; and
correct the fuel injection amount.

12. The engine according to claim 11,
wherein the control means is configured to calculate an appropriate supercharger speed change rate and an appropriate supercharger speed change rate tolerance based on the engine speed change rate, the supercharging pressure change rate and the fuel injection amount change rate, and wherein, when the supercharger speed change rate is not within the appropriate supercharger speed change rate tolerance, the control means is configured to correct the fuel injection amount so as to make the supercharger speed change rate be within the appropriate supercharger speed change rate tolerance.

13. The engine according to claim 12, wherein, when the supercharger speed change rate is within the appropriate supercharger speed change rate tolerance, the control means defines the supercharger speed change rate as a modified value of the appropriate supercharger speed change rate.

14. The engine according to claim 11,
wherein the control means is configured to calculate an appropriate supercharging pressure change rate and an appropriate supercharging pressure change rate tolerance based on the engine speed change rate, the supercharger speed change rate and the fuel injection amount change rate, and wherein, when the supercharging pressure change rate is not within the appropriate supercharging pressure change rate tolerance, the control means is configured to correct the fuel injection amount so as to make the supercharging pressure change rate be within the appropriate supercharging pressure change rate tolerance.

15. The engine according to claim 14, wherein, when the supercharging pressure change rate is within the appropriate supercharging pressure change rate tolerance, the control means defines the supercharging pressure change rate as a modified value of the appropriate supercharging pressure change rate.

16. The engine according to claim 11,
wherein the control means is configured to calculate an appropriate engine speed change rate and an appropriate engine speed change rate tolerance based on the supercharger speed change rate, the supercharging pressure change rate and the fuel injection amount change rate, and wherein, when the engine speed change rate is not within the appropriate engine speed change rate tolerance, the control means is configured to correct the fuel injection amount so as to make the engine speed change rate be within the appropriate engine speed change rate tolerance.

17. The engine according to claim 16, wherein, when the engine speed change rate is within the appropriate engine speed change rate tolerance, the control means defines the engine speed change rate as a modified value of the appropriate engine speed change rate.

18. The engine according to claim 4,
   wherein the control means is configured to calculate an appropriate fuel injection amount correction tolerance based on the fuel injection amount, and
   wherein, when the corrected fuel injection amount is not within the appropriate fuel injection amount correction tolerance, the control means defines the corrected fuel injection amount as the maximum or minimum of the appropriate fuel injection amount correction tolerance.

19. The engine according to claim 6,
   wherein the control means is configured to calculate an appropriate fuel injection amount correction tolerance based on the fuel injection amount, and
   wherein, when the corrected fuel injection amount is not within the appropriate fuel injection amount correction tolerance, the control means defines the corrected fuel injection amount as the maximum or minimum of the appropriate fuel injection amount correction tolerance.

\* \* \* \* \*

UNITED STATES PATENT AND TRADEMARK OFFICE
CERTIFICATE OF CORRECTION

PATENT NO. : 8,423,266 B2  
APPLICATION NO. : 12/921746  
DATED : April 16, 2013  
INVENTOR(S) : Kawabe et al.

Page 1 of 1

It is certified that error appears in the above-identified patent and that said Letters Patent is hereby corrected as shown below:

In the Claims

Column 10, line 63 (claim 2): "wherein the, selected" should read --wherein the selected--.
Column 11, lines 16-17 (claim 4): "pressure the appropriate value" should read --pressure, the appropriate value--.

Signed and Sealed this
Third Day of December, 2013

Margaret A. Focarino
*Commissioner for Patents of the United States Patent and Trademark Office*